United States Patent [19]

Adachi et al.

[11] Patent Number: 4,678,064
[45] Date of Patent: Jul. 7, 1987

[54] SEALING BOOT FOR USE IN DISC BRAKE ASSEMBLY

[75] Inventors: Yoshiharu Adachi, Gamagoori; Fumio Fujimori, Anjo; Toshio Kondo; Hiroshi Uemura, both of Okazaki; Juichi Shibatani, Toyota, all of Japan

[73] Assignees: Aisin Seiki Kabushiki Kaisha, Kariya; Toyota Jidosha Kabushiki Kaisha, Toyota, both of Japan

[21] Appl. No.: 737,484

[22] Filed: May 24, 1985

[30] Foreign Application Priority Data

May 25, 1984 [JP] Japan .................... 59-077559[U]

[51] Int. Cl.⁴ .................... F16D 65/14; B61F 15/22
[52] U.S. Cl. .................... 188/73.45; 277/212 FB
[58] Field of Search ............... 188/73.43, 73.44, 73.45, 188/73.31, 370; 74/18.2; 92/168, 168 B; 277/212 FB, 211, 209, DIG. 4

[56] References Cited

U.S. PATENT DOCUMENTS

| | | | |
|---|---|---|---|
| 1,869,577 | 8/1932 | Oberhuber | 277/211 |
| 3,952,840 | 4/1976 | Yamazaki et al. | 188/73.31 X |
| 4,293,138 | 10/1981 | Swantee | 277/209 X |
| 4,447,066 | 5/1984 | Katagiri et al. | 277/212 FB |
| 4,557,354 | 12/1985 | Sakakibara | 188/73.45 |

FOREIGN PATENT DOCUMENTS 54-158186 11/1979 Japan .

Primary Examiner—Andres Kashnikow
Assistant Examiner—Robert J. Oberleitner
Attorney, Agent, or Firm—Oblon, Fisher, Spivak, McClelland & Maier

[57] ABSTRACT

A sealing boot for use in a disc brake assembly which includes a stationary support member having a support pin fixed thereto, and a caliper member having a boss portion slidably supported on the support pin. The sealing boot includes a bellows portion integrally formed at the opposite ends thereof with an outside cylindrical sealing portion coupled over the support pin and an inside cylindrical sealing portion coupled within an annular groove in the boss portion, the inside sealing portion being formed at its outer circumference with a first annular projection is contact with the bottom surface of the annular groove and at its inner circumference with a second annular projection sliding in contact with the support pin. The first annular projection of the inside sealing portion is formed at its one side with a steep annular surface directed outwardly and at its other side with a gentle slope annular surface and has a rounded annular head in contact with the bottom surface of the annular groove. The second annular projection is slightly displaced relative to the first annular projection.

11 Claims, 4 Drawing Figures

SEALING BOOT FOR USE IN DISC BRAKE ASSEMBLY

BACKGROUND OF THE INVENTION

The present invention relates to a disc brake assembly for wheeled vehicles, and more particularly to a disc brake assembly of the pin slide type which includes a stationary support member mounted on a vehicle body structure, a caliper member axially slidably mounted on the stationary support member, and at least one support pin fixed to either the stationary support member or the caliper member and slidably inserted into an axial bore in the other member for slidable support of the caliper member.

In such a disc brake assembly, a sealing boot is arranged in surrounding relationship with the support pin to hermetically close an annular opening between the support pin and the axial bore. The conventional sealing boot includes a bellows portion which is integrally formed at the opposite ends thereof with an outside cylindrical sealing portion coupled over the support pin and an inside cylindrical sealing portion coupled within an annular groove in the other member. The inside cylindrical sealing portion of the bellows portion acts to prevent entry of water and dirt into the sealing boot and to absorb vibration acting thereto from the caliper member during travel of the vehicle on a rough road. In the case that the caliper member is heavy in weight for use in a heavy vehicle such as a truck, the inside cylindrical sealing portion of the boot may not be deformed in response to vibration of the caliper member. If the sealing portion is greatly deformed in a moment, the outer circumference of the sealing portion will be separated from the bottom surface of the annular groove to allow water and dirt to be sucked into the sealing boot. Although such a problem can be solved by enlarging the interference of the sealing portion, the assembling work of the sealing portion becomes difficult, and the sliding resistance of the caliper member increases, resulting in defacement of the sealing portion in a short period of time.

SUMMARY OF THE INVENTION

It is, therefore, a primary object of the present invention to provide an improved sealing boot of elastomeric material the inside cylindrical sealing portion of which is constructed to ensure the sealing function of the boot without causing any increase of the sliding resistance of the caliper member and without causing any difficulty during assembling process of the sealing portion.

According to the present invention briefly summarized, the object is accomplished by providing a sealing boot of elastomeric material for hermetically closing an annular opening between a support member such as a support pin fixed to a stationary support member and a movable member such as a caliper member slidably supported on the support pin. The sealing boot includes a bellows portion which is integrally formed at the opposite ends thereof with an outside cylindrical sealing portion coupled over the support member and an inside cylindrical sealing portion coupled within an annular groove in the movable member, the inside cylindrical sealing portion of the bellows portion being formed at its outer circumference with a first annular projection in contact with the bottom surface of the annular groove and being formed at its inner circumference with a second annular projection in sliding contact with the outer circumference of the support member. In such an arrangement of the sealing boot, the second annular projection of the inside cylindrical sealing portion is slightly outwardly displaced relative to the first annular projection, and the first annular projection of the inside cylindrical sealing portion is formed at one side thereof with a steep annular surface directed outwardly and at the other side thereof with a gentle slope annular surface and has a rounded annular head in contact with the bottom surface of the annular groove.

With the sealing boot described above, the first annular projection of the inside cylindrical sealing portion is rotatably supported by the second annular projection in contact with the support member and is applied with a moment toward the bottom surface of the annular groove owing to the slight displacement of the second annular projection. As a result, the inside cylindrical sealing portion will be deformed in response to vibration of the movable member to maintain the engagement with the bottom surface of the annular groove at its first annular projection thereby to prevent entry of water and dirt into the sealing boot. When the inside cylindrical sealing portion is deformed or tilted in the annular groove, the rounded head of the first annular projection is maintained in engagement with the bottom surface of the annular groove to ensure the sealing function of the boot. In case the first annular projection of the inside cylindrical sealing portion is applied with an external high pressure or internal negative pressure, it will be radially outwardly expanded by the pressure acting on its steep annular surface to ensure the sealing function of the boot.

BRIEF DESCRIPTION OF THE DRAWINGS

Additional objects and advantages of the present invention will becomes more apparent from the following detailed description of a preferred embodiment thereof when considered with reference to the attached drawings, in which.

DETAILED DESCRIPTION OF THE PREFERRED EMBODIMENT

Figure 1:
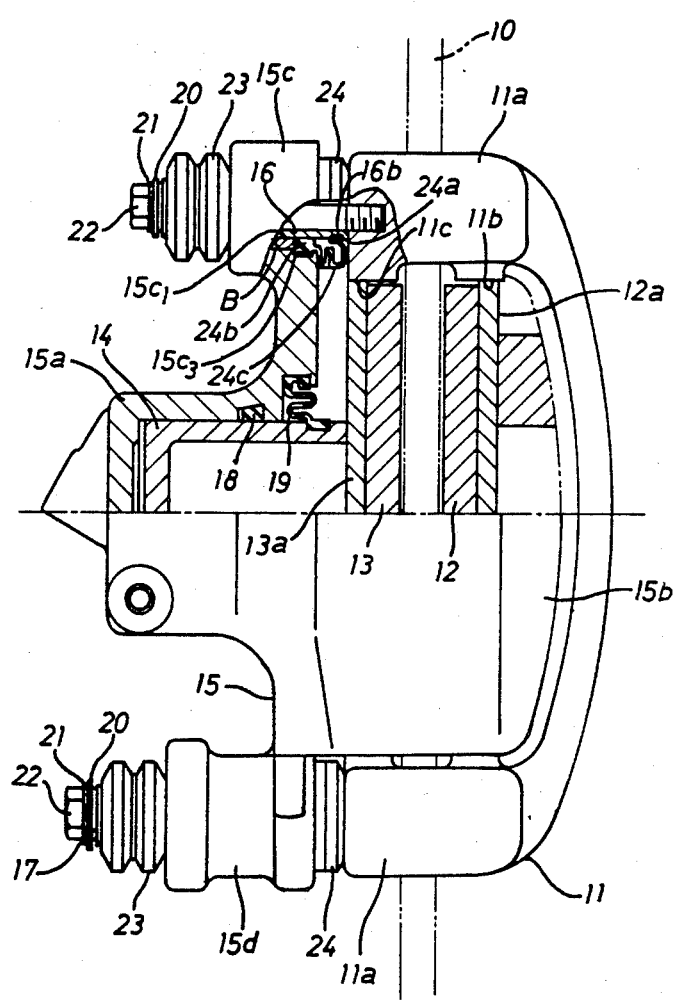
FIG. 1 is an elevation partly in section of a disc brake assembly of the pin slide type provided with a sealing boot in accordance with the present invention.

In FIG. 1 of the appended drawings, there is illustrated a front disc brake assembly of the pin slide type for a truck which includes a rotary brake disc 10 secured for rotation with a front road wheel of the truck, a stationary support member 11 mounted on a body structure of the truck such as a knuckle (not shown) at the inside of brake disc 10 (at the leftside in the figure), outer and inner brake shoes 12 and 13 carried on the stationary support member 11 at the opposite sides of brake disc 10, a caliper member 15 straddling a portion of brake disc 10, and a pair of support pins 16 and 17 in parallel fixed to the stationary support member 11 to support the caliper member 15 thereon.

The stationary support member 11 has a pair of arms 11a, 11a straddling the brake disc 10 and is formed with a pair of recessed portions 11b and 11c wherein backing plates 12a and 13a of the brake shoes 12, 13 are respectively assembled to be axially movable. The brake shoes 12 and 13 are respectively provided with outer and inner friction pads 12b and 13b secured to the backing plates 12a, 13a. The caliper member 15 has a C-shaped cross-section for straddling the brake disc 10 and both the brake shoes 12, 13 and has a cylinder body 15a and a reaction portion 15b. The caliper member 15 is integrally formed at the opposite sides thereof with a pair of arm bosses 15c and 15d which are slidably supported on the support pins 16 and 17 to be movable in the axial direction of brake disc 10. Both the caliper arm bosses 15c and 15d each are integrally provided therein with a sleeve-like metal bearing B. Within a cylindrical bore formed in the cylinder body 15a, a cup-shaped piston 14 is axially slidably disposed through an annular sealing member 18 to press the inner brake shoe 13 directly against one face of the brake disc 10. The annular sealing member 18 has a well-known function for retracting the piston 14 in response to release of pressurized fluid applied thereto. An annular elastic boot 19 is disposed to enclose the sliding portion between piston 14 and cylinder body 15a.

The support pins 16 and 17 each are in the form of a hollow pin which is fixed to the stationary support member 11 by means of a fastening bolt 22 threaded into the support member 11 through a flat washer 20 and a spring washer 21. Both the support pins 16 and 17 are respectively provided thereon with sealing boots 23 and 24 which are arranged to enclose the sliding portions between support pins 16, 17 and caliper arm bosses 15c, 15d, respectively.

Figure 2:
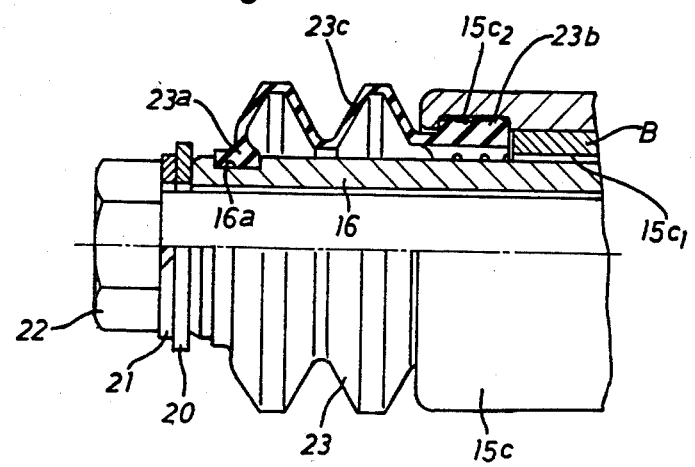
FIG. 2 is an enlarged view illustrating partly in section the sealing boot used in the disc brake assembly of FIG. 1.

The sealing boots 23 and 24 are made of elastomeric material such as rubber. As is clearly illustrated in FIG. 2, the sealing boot 23 includes a bellows portion 23c which is integrally formed at the opposite ends thereof with a pair of cylindrical sealing portions 23a and 23b respectively attached to the support pin 16 and the caliper arm boss 15c. The outside cylindrical sealing portion 23a of boot 23 is coupled within an annular groove 16a of the support pin 16. The inside cylindrical sealing portion 23b of boot 23 is coupled within an annular groove $15c_2$ formed in the caliper arm boss 15c. The inside cylindrical sealing portion 23b is pressed into contact with the bottom surface of annular groove $15c_2$ and is in sliding contact with the outer circumference of support pin 16.

Substantially as same as the sealing boot 23, the sealing boot 24 includes a bellows portion 24c which is integrally formed at the opposite ends thereof with a pair of cylindrical sealing portions 24a and 24b respectively attached to the support pin 16 and the caliper arm boss 15c. The cylindrical sealing portion 24a of boot 24 is coupled within an annular groove 16b of the support pin 16, while the other cylindrical sealing portion 24b is coupled within an annular groove $15c_3$ formed in the caliper arm boss 15c. The cylindrical sealing portion 24b is pressed into contact with the bottom surface of annular groove $15c_3$ and is in sliding contact with the outer circumference of support pin 16. Both the cylindrical sealing portions 23b and 24b are respectively formed at their inner circumferences with axial grooves which are arranged to intercommunicate the interiors of sealing boots 23 and 24 through an axial bore $15c_1$ in the caliper arm boss 15c.

Figure 3:
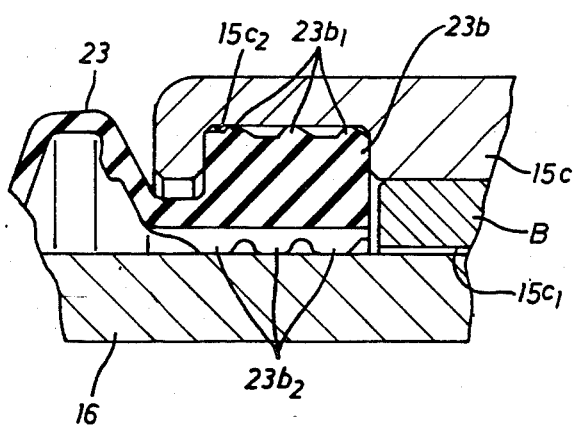
FIG. 3 is an enlarged sectional view illustrating a portion of FIG. 2.
Figure 4:
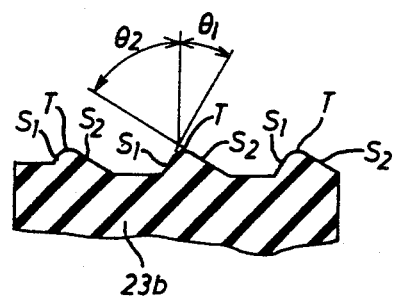
FIG. 4 is an enlarged sectional view illustrating partly an inside cylindrical sealing portion of the boot shown in FIG. 3.

Hereinafter, the construction of sealing boot 23 will be described in detail. As can be well seen in FIG. 3, the inside cylindrical sealing portion 23b of boot 23 is formed at its outer circumference with three parallel axially spaced annular projections $23b_1$ and formed at its inner circumference with three parallel axially spaced annular projections $23b_2$. As shown in FIG. 4, the annular projections $23b_1$ each are formed at one side thereof with a steep annular surface $S_1$ directed toward the open end of axial bore $15c_1$ and at the other side thereof with a gentle slope annular surface $S_2$. In this embodiment, an angle $\theta_1$ for the steep annular surface $S_1$ is determined to be 30 degrees, and an angle $\theta_2$ for the gentle slope annular surface $S_2$ is determined to be 60 degree. The annular projections $23b_1$ each has a rounded head T which is pressed into contact with the bottom surface of annular groove $15c_2$. The annular projections $23b_2$ each are formed with a trapezoid cross-section and slidingly engage the outer circumference of support pin 16. The annular projections $23b_2$ each are slightly displaced, relative to the respective annular projection $23b_1$, toward the open end of axial bore $15c_1$. The outer diameter of cylindrical sealing portion 23b in its free condition is determined to be larger than the diameter of annular groove $15c_2$ so that the inner diameter of cylindrical sealing portion 23b in its assembled condition is biased against the surface of support pin 16.

In the assembled condition of sealing boot 23, 23, the annular projections $23b_1$ of sealing portion 23b are floatably supported by the annular projections $23b_2$ and are applied with a moment toward the bottom surface of annular groove $15c_2$ owing to the slight displacement of each annular projection $23b_2$ relative to each annular projection $23b_1$. As a result, the sealing portion 23b of boot 23 will be deformed in response to severe vibration of the caliper member 15 to maintain the engagement with the bottom surface of annular groove $15c_2$ at its annular projections 23b, thereby to prevent entry of water and dirt into the sealing boot 23. When the sealing portion 23b is deformed or tilted in the annular groove $15c_2$, the rounded head T of each annular projection $23b_1$ is maintained in engagement with the bottom surface of annular groove $15c_2$ to ensure the sealing function of boot 23. When the disc brake assembly is washed by water under high pressure, each annular projection $23b_1$ of sealing portion 23b tends to be radially expanded by the water pressure acting on its steep annular surface $S_1$ so as to ensure the sealing function of boot 23. Since the above-described sealing construction can be realized only by modification of the shape of cylindrical sealing portion 23b, the present invention can be practiced without causing any difficulty during the assembling process of the sealing boot 23 and without causing any increase of sliding resistance of the caliper member 15.

From the above description, it will be undersood that the construction of sealing portion 23b can be adapted to the sealing portion 24b of boot 24 substantially in the same manner. Alternatively, the present invention can be adapted to a disc brake assembly of the pin slide type wherein the support pin is fixed to the caliper member and slidably inserted into an axial bore in the stationary support member for slidable support of the caliper member.

Although a certain specific embodiment of this invention has been illustrated and described, it is obvious that many modifications thereof are possible. The invention, therefore, is not intended to be restricted to the exact showing of the drawings and description thereof, but is considered to include reasonable and obvious equivalents.

What is claimed is:

1. A sealing boot of elastomeric material for use in a disc brake assembly of the pin slide type which includes a stationary support member, a caliper member slidably mounted on said stationary support member, and at least one support pin fixed to one of said stationary support member and said caliper member and being slidably inserted into an axial bore formed in the other of said members for slidable support of said caliper member, said sealing boot being arranged in surrounding relationship with said support pin and including a bellows portion which is integrally formed at opposite ends thereof with an outside cylindrical sealing portion coupled over said support pin and an inside cylindrical sealing portion coupled within an annular groove formed in said other member, the inside cylindrical sealing portion being retainingly disposed between opposed end walls of said annular groove, being formed at its outer circumference with a first annular projection in contact with the bottom surface of said annular groove, and being formed at its inner circumference with a second annular projection in sliding contact with the outer circumference of said support pin to permit sliding movement of the inside cylindrical sealing portion on said support pin, wherein the second annular projection of said inside cylindrical sealing portion is slightly displaced relative to the first annular projection toward an open end of said axial bore in said other member, wherein the first annular projection of said inside cylindrical sealing portion is formed at one side thereof with a steep annular surface directed toward the open end of said axial bore and at the other side thereof with a gentle slope annular surface and has a rounded annular head in contact with the bottom surface of said annular groove, and wherein said first annular projection is disposed in spaced relation with respect to both of said opposed end walls of said annular groove and in position to be radially expanded by a fluid pressure acting on the steep annular surface thereof.

2. A sealing boot as recited in claim 1, wherein the second annular projection of said inside cylindrical sealing portion has a trapezoid cross-section.

3. A sealing boot as recited in claim 1, wherein said steep annular surface is disposed at an angle of substantially sixty degrees with respect to said bottom surface of said annular groove, and wherein said gentle slope annular surface is disposed at an angle of substantially thirty degrees with respect to said bottom surface of said annular groove.

4. A sealing boot as recited in claim 1, said inside cylindrical sealing portion comprising moment-creating means for biasing said first annular projection toward said bottom surface of said annular groove in response to applied vibration, said moment-creating means comprising said relative displacement of said first and second annular projections.

5. A sealing boot of elastomeric material for use in a disc brake assembly of the pin slide type which includes a stationary support member having at least one support pin fixed thereto, and a caliper member having a boss portion axially slidably supported on said support pin, said sealing boot being arranged in surrounding relationship with said support pin and including a bellows portion which is integrally formed at opposite ends thereof with an outside cylindrical sealing portion coupled over said support pin and an inside cylindrical sealing portion coupled within an annular groove in the boss portion of said caliper member, the inside cylindrical sealing portion being retainingly disposed between opposed end walls of said annular groove, being formed at its outer circumference with a first annular projection in contact with the bottom surface of said annular groove, and being formed at its inner circumference with a second annular projection in sliding contact with the outer circumference of said support pin to permit sliding movement of the inside cylindrical sealing portion on said support pin, wherein the second annular projection of said inside cylindrical sealing portion is slightly displaced relative to the first annular projection toward the exterior, wherein the first annular projection of said inside cylindrical sealing portion is formed at one side thereof with a steep annular surface directed outwardly and at the other side thereof with a gentle slope annular surface and has a rounded annular head in contact with the bottom surface of said annular groove, and wherein said first annular projection is disposed in spaced relation with respect to both of said opposed end walls of said annular groove and in position to be radially expanded by a fluid pressure acting on the steep annular surface thereof.

6. A sealing boot as recited in claim 5, wherein the inside cylindrical sealing portion of said boot is formed at its outer circumference with a plurality of axially spaced first annular projections in contact with the bottom surface of said annular groove and is formed at its inner circumference with a plurality of axially spaced second annular projections in sliding contact with the outer circumference of said support pin to permit sliding movement of the inside cylindrical sealing portion on said support pin, wherein the second annular projections each are slightly displaced relative to the first annular projections, and each of the first annular projections is formed at one side thereof with a steep annular surface directed outwardly and at the other side thereof with a gentle slope annular surface and has a rounded annular head in contact with the bottom surface of said annular groove, and wherein said first annular projections are disposed in spaced relation with respect to both of said opposed end walls of said annular groove and in position to be radially expanded by a fluid pressure acting on the respective steep annular surfaces thereof.

7. A sealing boot as recited in claim 5, wherein said steep annular surface is disposed at an angle of substantially sixty degrees with respect to said bottom surface of said annular groove, and wherein said gentle slope annular surface is disposed at an angle of substantially thirty degrees with respect to said bottom surface of said annular groove.

8. A sealing boot as recited in claim 5, said inside cylindrical sealing portion comprising moment-creating means for biasing said first annular projection toward said bottom surface of said annular groove in response to applied vibration, said moment-creating means comprising said relative displacement of said first and second annular projections.

9. A sealing boot of elastomeric material for hermetically closing an annular opening between a support member and a movable member reciprocably coupled over said support member, said sealing boot including a bellows portion which is integrally formed at opposite ends thereof with an outside cylindrical sealing portion coupled over said support member and an inside cylindrical sealing portion coupled within an annular groove in said movable member, the inside cylindrical sealing portion of said bellows portion being retainingly disposed between opposed end walls of said annular groove, being formed at its outer circumference with a first annular projection in contact with the bottom surface of said annular groove, and being formed at its inner circumference with a second annular projection in sliding contact with the outer circumference of said support member to permit sliding movement of the inside cylindrical sealing portion on said support pin, wherein the second annular projection of said inside cylindrical sealing portion is slightly displaced relative to the first annular projection toward the exterior, and the first annular projection of said inside cylindrical sealing portion is formed at one side thereof with a steep annular surface directed outwardly and at the other side thereof with a gentle slope annular surface and has a rounded annular head in contact with the bottom surface of said annular groove, and wherein said first annular projection is disposed in spaced relation with respect to both of said opposed end walls of said annular groove and in position to be radially expanded by a fluid pressure acting on the steep annular surface thereof.

10. A sealing boot as recited in claim 9, wherein said steep annular surface is disposed at an angle of substantially sixty degrees with respect to said bottom surface of said annular groove, and wherein said gentle slope annular surface is disposed at an angle of substantially thirty degrees with respect to said bottom surface of said annular groove.

11. A sealing boot as recited in claim 9, said inside cylindrical sealing portion comprising moment-creating means for biasing said first annular projection toward said bottom surface of said annular groove in response to applied vibration, said moment-creating means comprising said relative displacement of said first and second annular projections.

* * * * *